United States Patent
Matsubayashi et al.

(10) Patent No.: US 7,008,574 B2
(45) Date of Patent: Mar. 7, 2006

(54) METHOD FOR CONTROLLING INJECTION OF ELECTRIC INJECTION MOLDING MACHINE

(75) Inventors: Haruyuki Matsubayashi, Shizuoka (JP); Yukio Iimura, Shizuoka (JP); Takashi Yamazaki, Shizuoka (JP); Akira Kanda, Shizuoka (JP); Takamitsu Yamashita, Shizuoka (JP); Yutaka Yamaguchi, Shizuoka (JP); Masamitsu Suzuki, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 212 days.

(21) Appl. No.: 10/677,249

(22) Filed: Oct. 3, 2003

(65) Prior Publication Data

US 2004/0075183 A1     Apr. 22, 2004

Related U.S. Application Data

(62) Division of application No. 09/908,491, filed on Jul. 19, 2001, now Pat. No. 6,669,459.

(30) Foreign Application Priority Data

Jul. 26, 2000   (JP)   ............................. 2000-225952

(51) Int. Cl.
    *B29C 45/77*   (2006.01)

(52) U.S. Cl. .................................... 264/40.1; 425/145

(58) Field of Classification Search ............... 264/40.1, 264/40.3, 40.7; 425/145, 149, 143
    See application file for complete search history.

(56) References Cited

U.S. PATENT DOCUMENTS

| | | | |
|---|---|---|---|
| 4,889,478 A | 12/1989 | Sato | |
| 4,952,364 A | 8/1990 | Matsuda et al. | |
| 5,911,924 A * | 6/1999 | Siegrist et al. | ............. 264/40.1 |
| 6,325,954 B1 | 12/2001 | Sasaki et al. | |
| 6,416,694 B1 | 7/2002 | Ishikawa | |

FOREIGN PATENT DOCUMENTS

| | | |
|---|---|---|
| JP | 63-69618 | 3/1988 |
| JP | 5-77300 | 3/1993 |

OTHER PUBLICATIONS

Japanese Office Action for Application No. 2000-225952, dated Sep. 27, 2005, none English.

* cited by examiner

*Primary Examiner*—Jill L. Heitbrink
(74) *Attorney, Agent, or Firm*—Pillsbury Winthrop Shaw Pittman, LLP

(57) ABSTRACT

An electric injection molding machine capable of maintaining a quality of molded articles and capable of suppressing a variation of weight of articles molded by a mold having a plurality of cavities when transferring molding conditions in a hydraulic injection molding machine as they are to the electric injection molding machine. This electric injection molding machine has an electric injection mechanism for injecting a molding material into a mold by a drive force of an electric motor, an injection control unit and a servo driver for controlling the injection motor so as to follow the injection speed reference, and an reference compensation unit for compensating the injection speed reference based on the characteristics of the hydraulic drive system so that fluctuation characteristics of the injection speed with respect to the injection pressure when controlling the electric injection mechanism approximate the fluctuation characteristics of the injection speed with respect to the injection pressure in the hydraulic injection mechanism performing the injection of the molding material to the mold by the hydraulic drive system.

4 Claims, 12 Drawing Sheets

FIG. 10

| |
|---|
| $\Delta t, \Delta S_0, N_0$ |
| $\Delta t, \Delta S_{12}, N_{12}$ |
| $\Delta t, \Delta S_{23}, N_{23}$ |
| $\Delta t, \Delta S_{34}, N_{34}$ |
| $\Delta t, \Delta S_{45}, N_{45}$ |
| $\Delta t, \Delta S_{56}, N_{56}$ |

FIG. 11

| |
|---|
| COMPENSATION CONTROL EXISTS/DOES NOT EXIST |
| CALCULATION EQUATION PARAMETER 1 |
| CALCULATION EQUATION PARAMETER 2 |
| ⋮ |
| FACTOR SELECTION PARAMETER |

METHOD FOR CONTROLLING INJECTION OF ELECTRIC INJECTION MOLDING MACHINE

CROSS-REFERENCE TO RELATED APPLICATIONS

This is a Divisional Application of U.S. application Ser. No. 09/908,491, filed Jul. 19, 2001 now U.S. Pat. No. 6,669,459, which claims priority from the prior Japanese Patent Application No. 2000-225952, filed Jul. 26, 2000, the entire contents both of which are incorporated herein by reference.

TECHNICAL FIELD OF THE INVENTION

The present invention relates to an electric injection molding machine and a method for controlling injection of the same.

DESCRIPTION OF THE RELATED ART

Injection control of an electric injection molding machine for injecting a molding material by the drive force of a servo motor is characterized in that the injection speed and the injection pressure can be controlled with a good response since the servo motor follows control references with a good precision and therefore maintenance of a stable molding precision is possible.

On the other hand, in a hydraulic injection molding machine for injecting a molding material by hydraulics, changes in the temperature of the hydraulic working oil exerts an influence upon the working characteristics of the machine, so the maintenance of a stable molding precision is difficult. Also, the viscoelastic property (compressibility) of the working oil and the characteristics of the hydraulic equipment are not negligible magnitudes, so there are the problems in that nonlinearity is apt to occur between the control references and actual injection speed and injection pressure, so the controllability is poor.

In view of this, there has been a shift from hydraulic injection molding machines to electric injection molding machines.

In order to mold similar molded articles, there are various problems in shifting from hydraulic injection molding machines to electric injection molding machines.

For example, even if setting molding conditions giving a good molding quality set for a hydraulic injection molding machine (injection speed pattern) as they are for an electric injection molding machine, a similar quality is not always obtained. This is because the response characteristics of the actual injection speed and injection pressure with respect to the references differ between hydraulic injection molding machines and electric injection molding machines. For this reason, it was difficult to transplant molding conditions (injection speed pattern) set for a hydraulic injection molding machine to an electric injection molding machine as they are and it was difficult to effectively utilize the molding conditions accumulated in a hydraulic injection molding machine for an electric injection molding machine.

Also, when using the molding conditions set for a hydraulic injection molding machine in an electric injection molding machine and for example injection molding using a mold having a plurality of cavities, there was also the problem that the fluctuations in weight among several molded articles became large.

Further, in an electric injection molding machine, during injection speed control for controlling the injection speed so as to follow references, the injection speed does not slow even when the injection pressure rises when the molding material passes through the gate of the mold. Therefore, most of the molding material heads toward the route through which the material most easily flows in the mold, so the amounts of material filled in the cavities become nonuniform. It is possible to set molding conditions for reducing the variation of weight among a plurality of molded articles in an electric injection molding machine, but it is very difficult to determine such molding conditions. Also, it is necessary to finely set the molding conditions and precisely control the injection speed. Therefore, much time and labor are required for setting the molding conditions.

SUMMARY OF THE INVENTION

An object of the present invention is to provide an electric injection molding machine capable of molding an article having a good quality when transplanting molding conditions in a hydraulic injection molding machine to an electric injection molding machine as they are.

Another object of the present invention is to provide a method for controlling the injection of an electric injection molding machine capable of molding an article of a good quality when transplanting molding conditions in a hydraulic injection molding machine to an electric injection molding machine as they are.

Still another object of the present invention is to provide an electric injection molding machine capable of suppressing fluctuations of weight among articles molded by cavities in a mold having a plurality of cavities.

Still another object of the present invention is to provide a method for controlling the injection of an electric injection molding machine capable of suppressing fluctuations of weight among articles molded by cavities in a mold having a plurality of cavities.

According to a first aspect of the present invention, there is provided an electric injection molding machine comprising an electric injection mechanism for injecting a molding material into a mold by a drive force of an electric motor, a servo control means for controlling the injection motor so that an injection speed follows an injection speed reference based on predetermined molding conditions, and a compensating means for compensating the injection speed reference based on characteristics of a hydraulic drive system so that fluctuation characteristics of the injection speed with respect to the injection pressure when controlling the drive of the electric injection mechanism according to the molding conditions approximate the fluctuation characteristics of the injection speed with respect to the injection pressure in a hydraulic injection mechanism for injecting a molding material into a mold by the hydraulic drive system.

According to a second aspect of the present invention, there is provided a method for controlling the injection of an electric injection molding machine comprising a control step for servo control of a drive motor so that an electric injection mechanism for injecting a molding material into a mold by a drive force of an electric motor follows an injection speed reference based on predetermined molding conditions and a compensation step for compensating the injection speed reference based on characteristics of a hydraulic drive system so that fluctuation characteristics of the injection speed with respect to the injection pressure generated in the electric injection mechanism during servo control of the electric motor approximate the fluctuation characteristics of the injection speed with respect to the injection pressure in a hydraulic injection mechanism for injecting a molding material into a mold by the hydraulic drive system.

In the present invention, the injection speed reference is compensated based on the characteristics of a hydraulic drive system so that the fluctuation characteristics of the injection speed with respect to the injection pressure in the electric injection molding machine approximate the fluctuation characteristics of the injection speed with respect to the injection pressure in a hydraulic injection molding machine. For this reason, when controlling the drive of the electric injection molding machine of the present invention under molding conditions for a hydraulic injection molding machine, the fluctuation characteristics of the injection speed with respect to the injection pressure approximate the characteristics of a hydraulic drive system.

BRIEF DESCRIPTION OF THE DRAWINGS

The above and other objects and features of the present invention will be more apparent from the following description given in relation to the attached drawings, wherein:

FIG. 10 is a view of an example of an injection speed reference data generated at an injection speed reference generation unit, FIG. 11 is a view of an example of parameters defined at a parameter storage unit.

DESCRIPTION OF THE PREFERRED EMBODIMENTS

Figure 1:
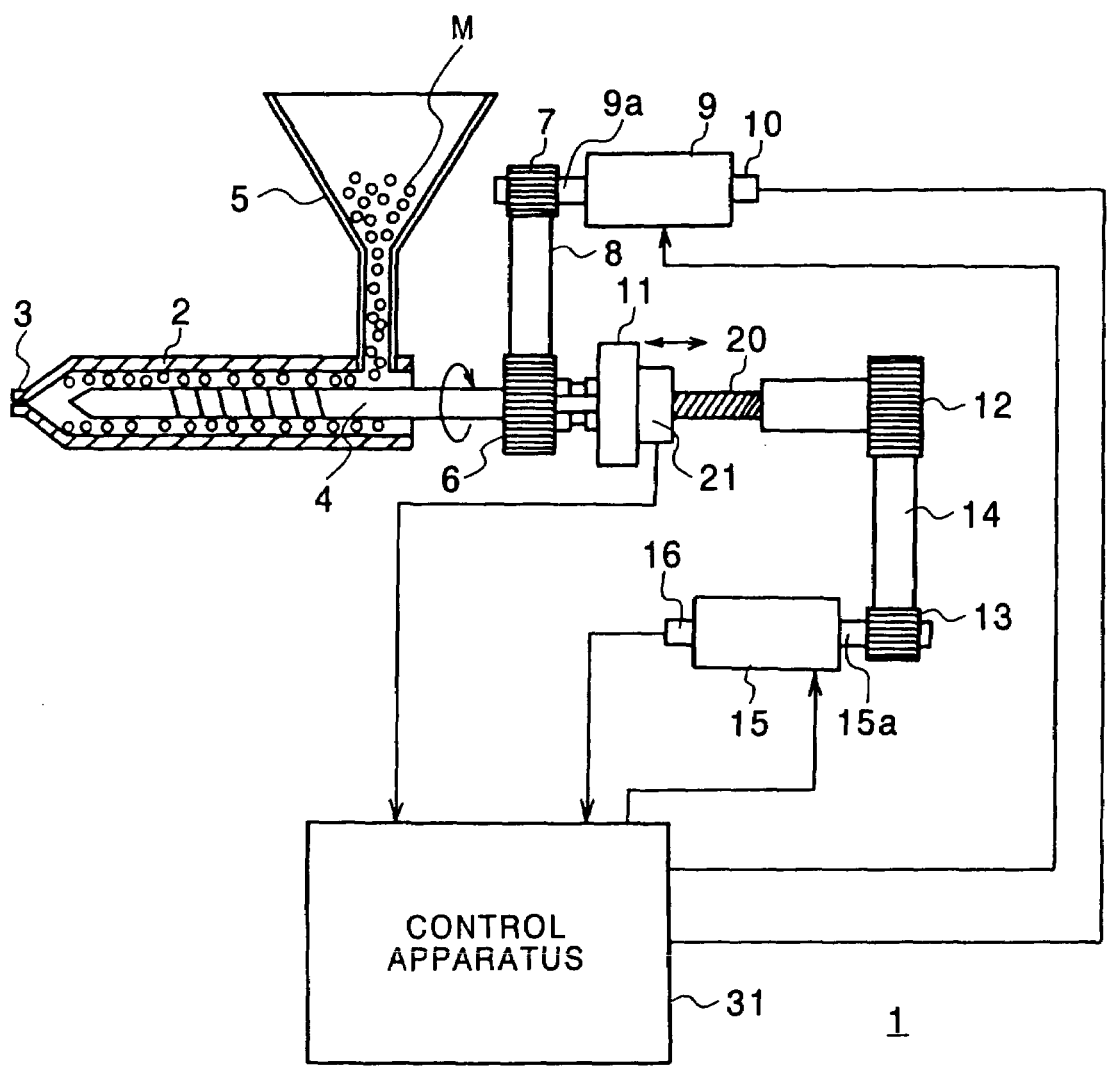
FIG. 1 is a view of an example of the configuration of an electric injection mechanism of an electric injection molding machine to which the present invention is applied.

Below, an explanation will be made of embodiments of the present invention by referring to the drawings.

FIG. 1 is a view of the configuration of an example of an electric injection mechanism of an electric injection molding machine to which the present invention is applied.

In FIG. 1, an electric injection mechanism 1 is provided with an injection cylinder 2 equipped with an injection nozzle 3 at its front end, an injection screw 4 moveably built in this injection cylinder 2, a hopper 5 for feeding the molding material into the injection nozzle 3, a plasticizing motor 9 for rotating the injection screw 4, and an injection motor 15 for directly moving the injection screw 4.

The injection cylinder 2 is provided with a not illustrated heating means for heating and melting a molding material M made of for example a rubber material or resin material. The molding material M is fed from the hopper 5.

The injection nozzle 3 provided at the front end of the injection cylinder 2 injects the heated and melted molding material M to a not illustrated mold in accordance with direct motion of the injection screw 4.

A pulley 6 is fixed to a rear end of the injection screw 4. This pulley 6 is connected to a pulley 7 fixed to a rotation shaft 9a of the plasticizing motor 9 by a timing belt 8. Accordingly, the rotation of the plasticizing motor 9 is transferred to the injection screw 4 by the timing belt 8, whereby the injection screw 4 rotates.

When the injection screw 4 rotates, the molding material M fed to the injection cylinder 2 and heated and melted passes through a not illustrated stopper valve and is accumulated at the injection nozzle 3 side of the injection cylinder 2. By this accumulation, the injection screw 4 retracts.

The plasticizing motor 9 is provided with a rotation position detector 10 comprised by for example an optical rotary encoder. A detection signal of the rotation position detector 10 is input to a control device 31.

On back side of the injection screw 4, a pressure plate 11 is provided so as to be moveable along an axial direction of the injection screw 4, while a ball screw shaft 20 is screwed with this pressure plate 11. The ball screw shaft 20 has a pulley 12 fixed to its rear end. This pulley 12 is connected to a pulley 13 fixed to a rotation shaft 15a of the injection motor 15 by a timing belt 14.

The rotation of the injection motor 15 is transferred to the ball screw shaft 20 by the timing belt 14. The pressure plate 11 directly is moved by the rotation of the ball screw shaft 20. When the pressure plate 11 is moved to the injection cylinder 2 side, the pressure plate 11 presses so that the injection screw 4 is moved to the injection nozzle 3 side. By the movement of the injection screw 4, the molding material is injected from the injection nozzle 3.

The injection motor 15 is provided with a rotation position detector 16 comprised by for example an optical rotary encoder. The detection signal of the rotation position detector 16 is input to a control apparatus 31. Note that the position and the injection speed of the injection screw 4 can be calculated from the detected position of the rotation position detector 16.

A pressure detector 21 comprised by for example a load cell for detecting a pressing force acting upon the pressure plate 11 is provided between the pressure plate 11 and the ball screw shaft 20. The detection signal of the pressure detector 21 is input to the control apparatus 31.

Note that the injection pressure of the injection screw 4 can be calculated from the pressure detected by the pressure detector 21.

The control apparatus 31 is an embodiment of the servo control means of the present invention. It controls the electric injection mechanism 1 and a not illustrated fastening device by a closed loop based on the position information detected by the rotation position detectors 10 and 16, the pressure detected by the pressure detector 21, and so on. The control apparatus 31 particularly controls the injection motor 15 so as to follow the injection speed references. Note that the concrete configuration of the control apparatus 31 will be explained later.

In the electric injection mechanism 1 having the above configuration, the molding material M is fed into the injection cylinder 2, the injection screw 4 is rotated while heating and melting this to accumulate a predetermined amount of molding material M in the front end of the injection cylinder 2, and then the injection screw 4 is advanced according to the set injection speed pattern to thereby inject the molding material M from the injection nozzle 3.

Figure 2:
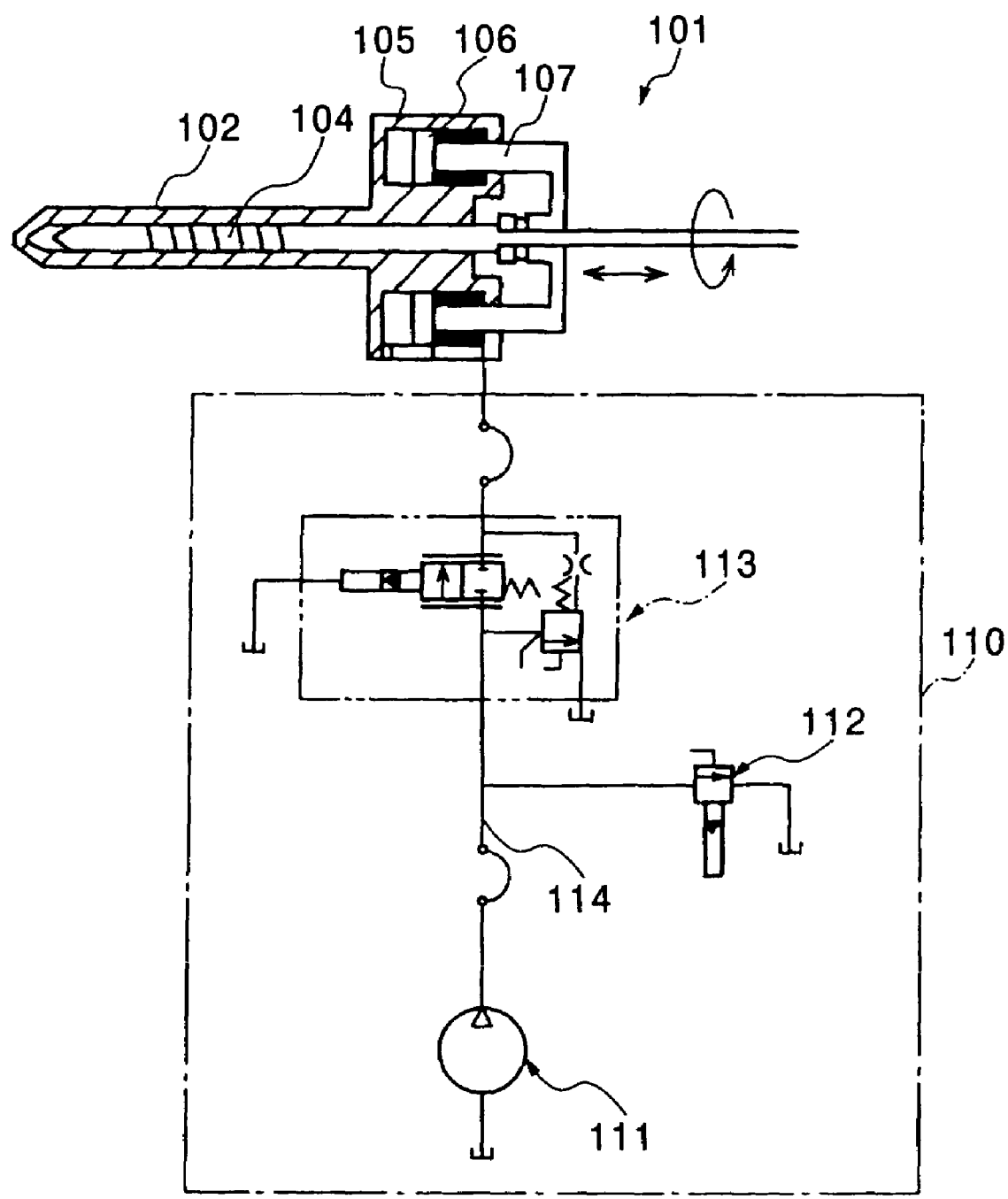
FIG. 2 is a view of an example of the configuration of an injection mechanism of a hydraulic injection molding machine.

FIG. 2 is a view of an example of the schematic configuration of the hydraulic injection mechanism of the hydraulic injection molding machine.

In FIG. 2, a hydraulic injection mechanism 101 is provided with an injection cylinder 102, an injection screw 104 moveably built in this injection cylinder 102, a hydraulic cylinder 105 for directly moving this injection screw 104, and a hydraulic circuit unit 110 for feeding the working oil to this hydraulic cylinder 105.

Note that, although not illustrated in FIG. 2, the hydraulic injection mechanism 101 is provided with a hopper for feeding the molding material and a rotation drive source for rotating the injection screw 104.

The hydraulic cylinder 105 includes a piston 106 built therein. A piston rod 107 connected to this piston 106 is connected to the injection screw 104.

Accordingly, the injection screw 104 is moved in the injection cylinder 102 by extension or contraction of the piston rod 107.

The hydraulic circuit unit 110 has a hydraulic pump 111, a servo valve 113 connected to this hydraulic pump 111 by a conduit 114, and a relief valve 112 provided in the conduit 114 between this servo valve 113 and the hydraulic pump 111.

The hydraulic pump 111 feeds working oil having the set pressure to the servo valve 113.

The servo valve 113 controls the flow rate of the working oil to be fed to the hydraulic cylinder 105 according to an reference from a not illustrated control apparatus so that the injection speed follows the references.

The relief valve 112 functions to allow this working oil to escape to a tank when the pressure of the working oil in the conduit 114 becomes the set pressure or more.

In the hydraulic injection mechanism 101 having the above configuration, in the same way as the electric injection mechanism 1 mentioned above, the molding material M is fed into the injection cylinder 102 and the injection screw 104 is rotated while heating and melting this to accumulate a predetermined amount of molding material M in the front end of the injection cylinder 102. Then the injection screw 4 is advanced according to the set injection speed pattern to thereby inject the molding material M from the front end of the injection cylinder 102.

Next, an explanation will be made of the difference of injection characteristics between an electric injection mechanism 1 and a hydraulic injection mechanism 101.

Figure 3:
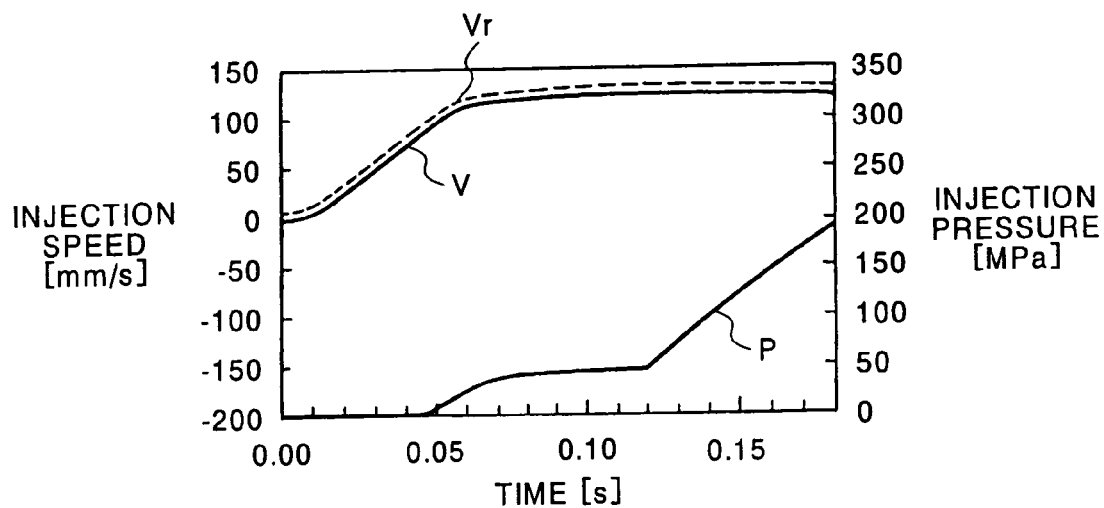
FIG. 3 is a graph of a waveform of an injection speed and an injection pressure when injecting a molding material into a mold by an electric injection mechanism.
Figure 4:
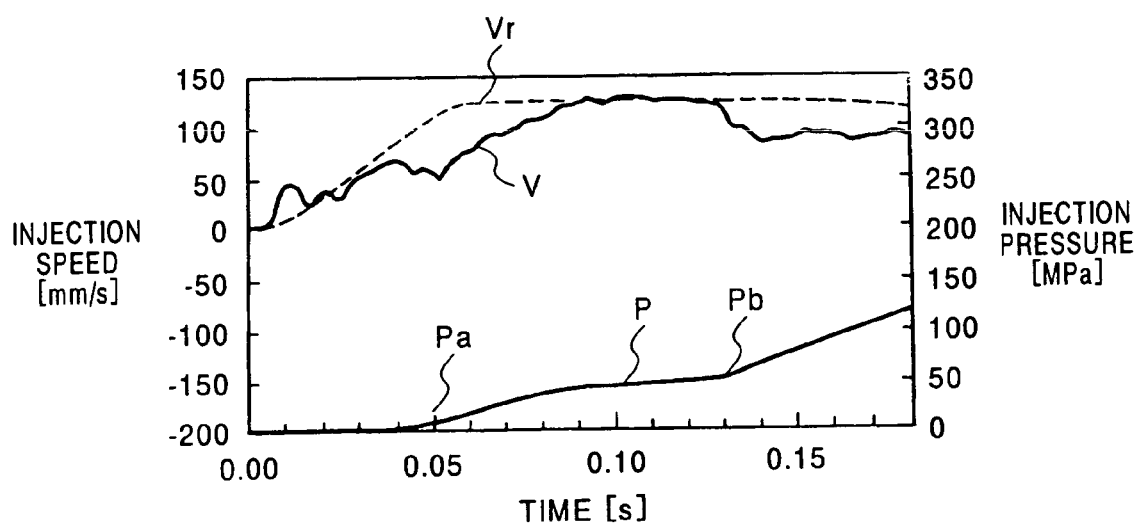
FIG. 4 is a graph of a waveform of the injection speed and the injection pressure when injecting a molding material into a mold by a hydraulic injection mechanism.

FIG. 3 is a graph of the waveforms of the injection speed and the injection pressure when injecting a molding material M into a mold by the electric injection mechanism 1. FIG. 4 is a graph of the waveforms of the injection speed and the injection pressure when injecting a molding material M into a mold by the hydraulic injection mechanism 101. Note that, in the injection control in FIG. 3 and FIG. 4, the injection speed is controlled by giving the same injection speed reference Vr to both of the electric injection mechanism 1 and the hydraulic injection mechanism 101.

As shown in FIG. 3, in the electric injection mechanism 1, it is seen that the injection speed V correctly follows the injection speed reference Vr. The injection speed V does not fluctuate even if the actual injection pressure P fluctuates.

On the other hand, as shown in FIG. 4, in the hydraulic injection mechanism 101, it is seen that the actual injection speed V slows near the positions Pa and Pb at which the value of the injection pressure P rises. Namely, in the hydraulic injection mechanism 101, when the value of the injection pressure P rises, the injection speed V slows, so does not follow the injection speed reference Vr. Namely, in the hydraulic injection mechanism 101, the injection speed V slows when the value of the injection pressure P rises, therefore has the characteristic that the injection pressure P and the injection speed V cannot easily change sharply. Such a characteristic becomes disadvantageous for precision molding, but in contrast, the injection pressure P and the injection speed V do not abruptly vary, so almost no abrupt changes occurs in a flow of the molding material M and it is easy to enhance the quality of molded articles.

Here, an explanation will be made of factors slowing the injection speed V with respect to a rise of the injection pressure P occurring in the hydraulic injection mechanism 101.

In the hydraulic injection mechanism 101, as a factor for slowing the injection speed with respect to a rise of the injection pressure, there can be mentioned for example the compressibility of the working oil, the fluctuation of the volumetric efficiency of the hydraulic pump, the override characteristic of the relief valve 112, the leakage of the working oil at the servo valve 113, or other characteristics of hydraulic equipment.

For example, working oil is compressed when the injection pressure P rises. The amount of compression is proportional to the amount of change of the injection pressure. When the working oil is compressed by the rise of the injection pressure P, the discharge of the hydraulic pump 111 appears to decrease by exactly the amount of this amount of compression of the working oil and the injection speed V slows.

When the amount of compression of the working oil is $\Delta V_C$ [mm$^3$], the volume of the conduit 114 and the hydraulic cylinder 105 in which the working oil exists is $V_0$ [mm$^3$], the amount of fluctuation of the injection pressure P is $\Delta P$ [MPa], the compression ratio of the working oil is $\beta$ ($7 \times 10^{-4}$ [1/MPa]), the amount of compression $\Delta V_C$ is expressed by the following equation:

$$\Delta V_C = V_0 \times \Delta P \times \beta \quad (1)$$

The volume of the conduit 114 is constant, but the volume of the hydraulic cylinder 105 varies according to the location of the injection screw 104. For this reason, when separately considering the volume of the conduit 114 and the volume of the hydraulic cylinder 105, if the volume of the conduit 114 is $V_1$, the amount of compression $\Delta V_1$ of the working oil in the conduit 114 is expressed by the following equation (2):

$$\Delta V_1 = V_1 \times \Delta P \times \beta \quad (2)$$

When the volume of the hydraulic cylinder 105 is $V_2$, the stroke of the injection screw 104 is $S_M$ [mm], and the location of the injection screw 104 is $S_P$ [mm], the amount of compression $\Delta V_2$ of the working oil in the hydraulic cylinder 105 is expressed by the following equation (3):

$$\Delta V_2 = V_2 \times \Delta P \times \beta \times (S_M - S_P)/S_M \quad (3)$$

Accordingly, the total amount of compression $\Delta V_C$ of the working oil is expressed by the following equation (4):

$$\Delta V_C = \Delta V_1 + \Delta V_2 \quad (4)$$

By this total amount of compression $\Delta V_C$ of the working oil, a deceleration $V_S$ of the slowing injection speed V can be quantified by the following equation (5). Note that, $A_1$ is the sectional area of the hydraulic cylinder 105:

$$V_S = \Delta V_C/A_1 \times 1000 \quad (5)$$

In this way, the deceleration $V_S$ of the injection speed V due to the influence of the compressibility of the working oil, one of the factors slowing the injection speed V, can be quantified.

As another factor slowing the injection speed V, the override characteristic of the relief valve 112 can be mentioned.

Figure 5:
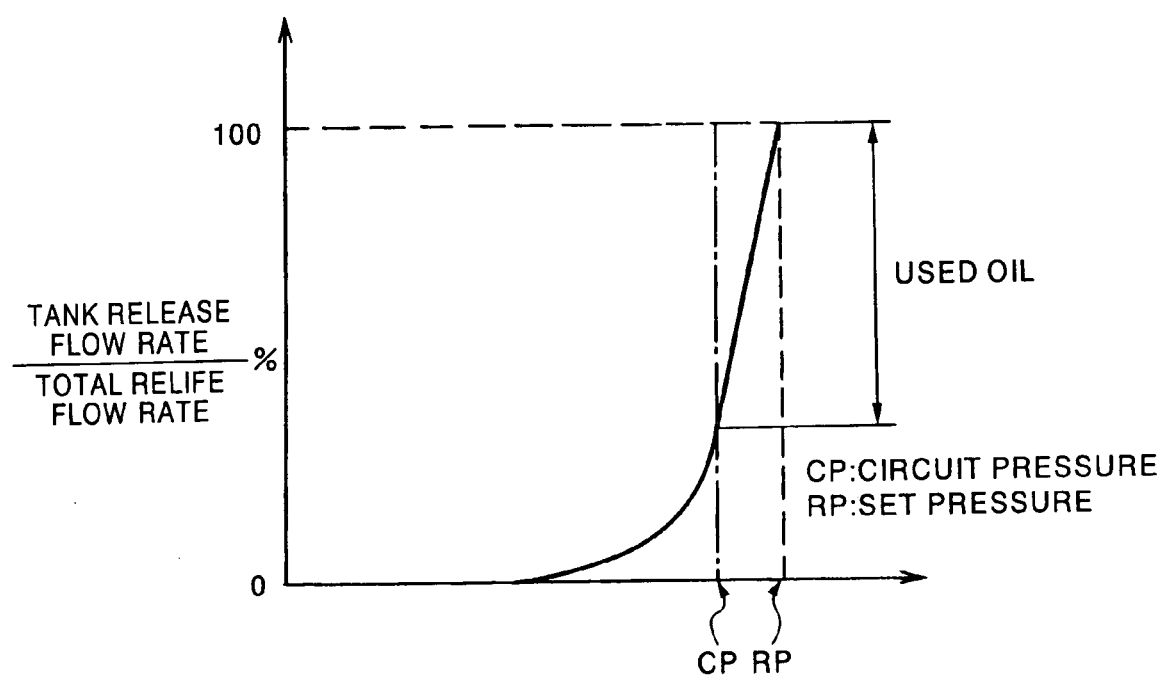
FIG. 5 is a graph of an override characteristic of a relief valve.

The override characteristic of the relief valve 112 is the characteristic by which, for example, as shown in FIG. 5, the relief valve 112 starts the release of the working oil to the tank before a circuit pressure CP reaches a set pressure RP.

For this reason, the amount of the working oil is lowered from a point of time when the relief valve 112 starts the release of the working oil to the tank, so the injection speed V also starts to slow.

Also the deceleration of the injection speed V due to the override characteristic of the relief valve 112 can be quantified from the relationship as shown in FIG. 5.

As still another factor slowing the injection speed V, the variation of the volumetric efficiency of the hydraulic pump 111 can be mentioned.

Figure 6:
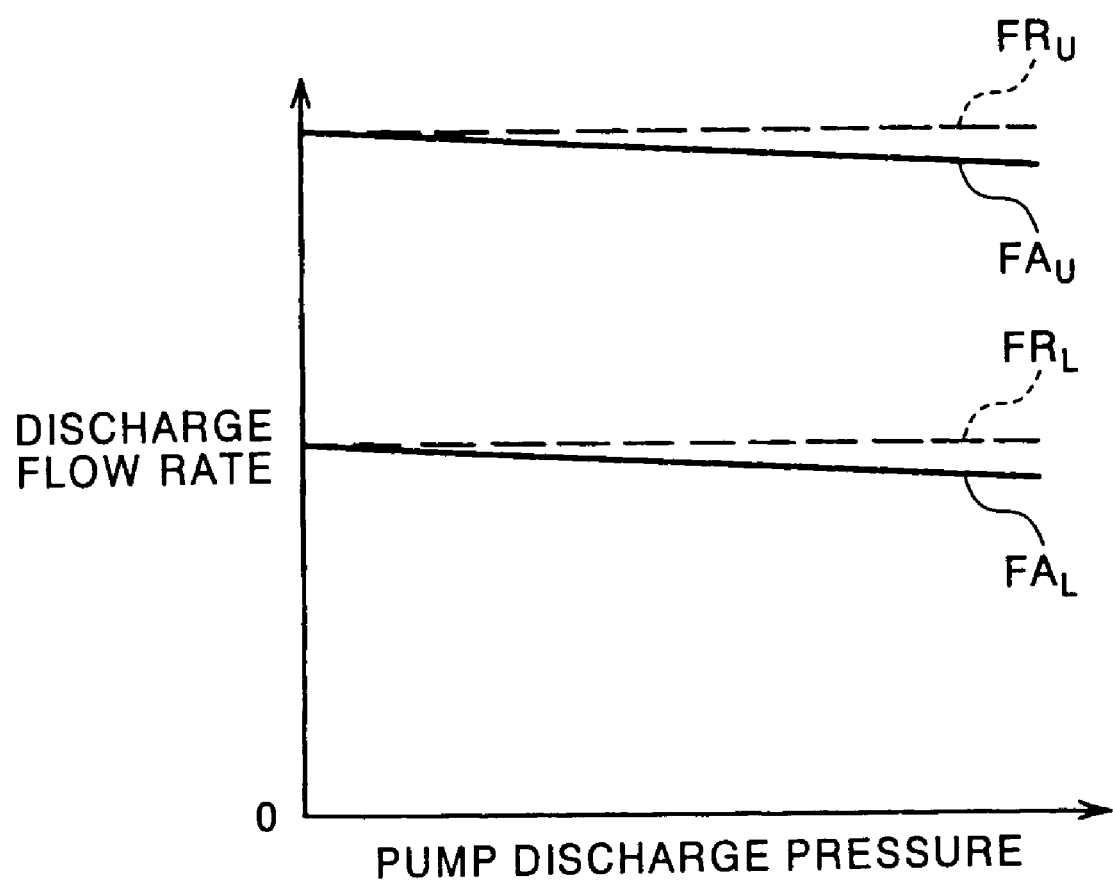
FIG. 6 is a graph of fluctuation characteristics of a volumetric efficiency of a hydraulic pump.

The flow rate of discharge of the hydraulic pump 111 decreases when the discharge pressure of the hydraulic pump 111 rises as shown in for example FIG. 6. This is because leakage of the oil occurs inside the hydraulic pump 111. By this, the injection speed V will be lowered when the injection pressure P rises. Note that, in FIG. 6, FRU indicates a high set flow rate, FRL indicates a low set flow rate, FAU indicates an actual discharge flow rate with respect to the high set flow rate FRU, and FAL indicates an actual discharge flow rate with respect to the low set flow rate FRL.

These characteristics of the hydraulic pump 111 are defined by the volumetric efficiency $\eta$ of the ratio between a theoretical discharge flow rate (discharge flow rate without load) of the hydraulic pump 111 and an actual discharge flow rate.

The volumetric efficiency $\eta$ of the hydraulic pump 111 varies in accordance with the rise of the injection pressure P.

When the deceleration of the injection speed V due to the change of the volumetric efficiency $\eta$ of the hydraulic pump 111 is $V_0$ [mm/s], the injection speed reference value is Vr [mm/s], the maximum injection pressure is $P_M$ [MPa], and the volumetric efficiency $\eta$ at the time of the maximum injection pressure is $\eta_M$, the deceleration $V_P$ can be expressed by the following equation (6):

$$V_P = Vr \times P/P_M \times (1 - \eta_M) \quad (6)$$

Other than the factors as explained above, in the hydraulic injection mechanism 101, there are factors slowing the injection speed with respect to the rise of the injection pressure, but quantification of the deceleration of the injection speed V due to the influence of these factors is possible.

Figure 7:
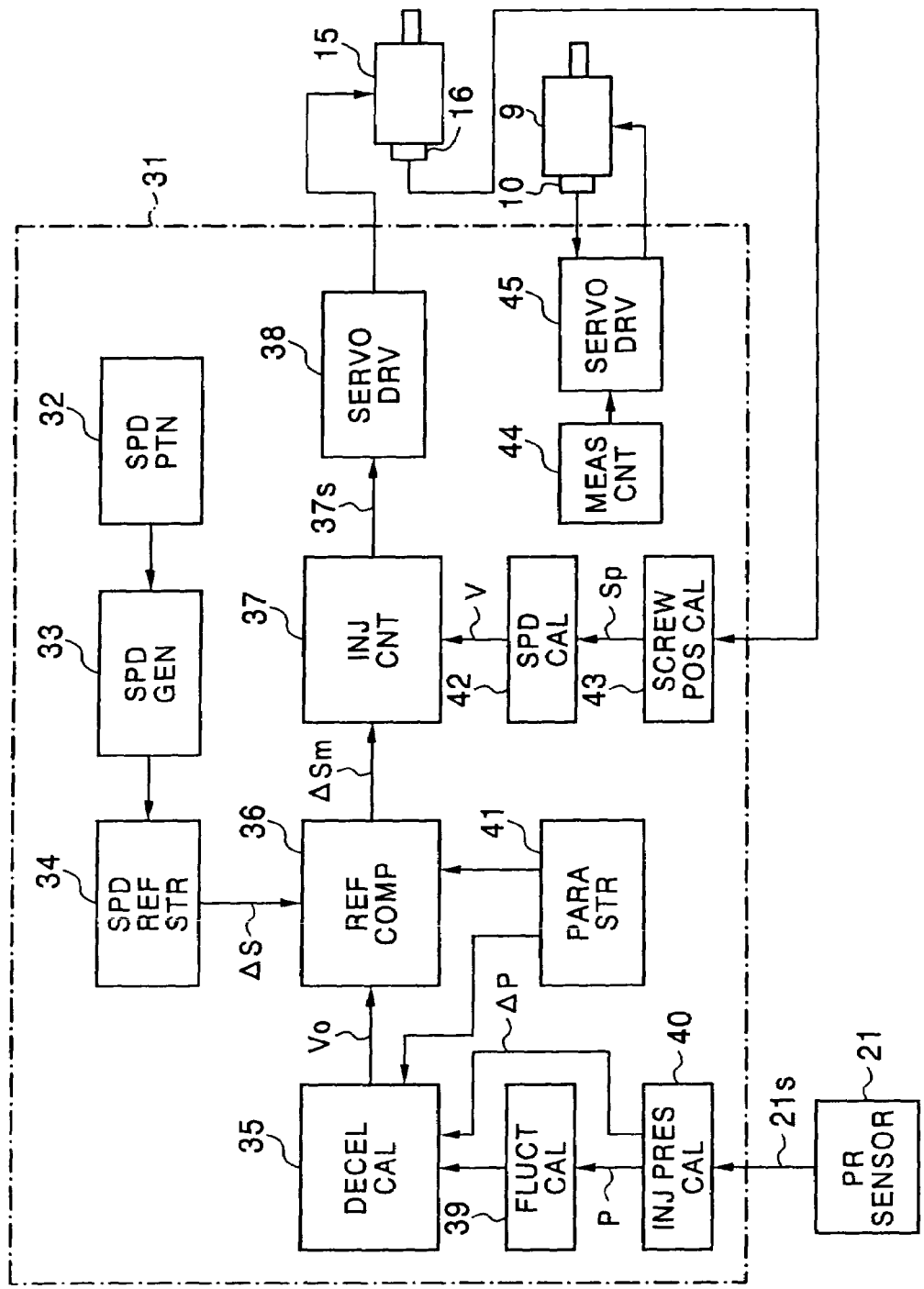
FIG. 7 is a functional block diagram of a control device according to an embodiment of the present invention.

FIG. 7 is a functional block diagram of the control apparatus 31 according to an embodiment of the present invention.

In FIG. 7, the control apparatus 31 has an injection speed pattern input unit 32, injection speed reference generation unit 33, injection speed reference data storage unit 34, deceleration calculation unit 35, reference compensation unit 36, injection control unit 37, servo driver 38, fluctuation calculation unit 39, injection pressure calculation unit 40, parameter storage unit 41, injection speed calculation unit 42, screw position conversion unit 43, measuring control unit 44, and servo driver 45.

Note that the deceleration calculation unit 35 is an embodiment of the deceleration calculation unit of the present invention, while the reference compensation unit 36 is an embodiment of the reference compensation unit of the present invention.

The injection speed pattern input unit 32 sets the injection speed pattern in accordance with the stroke position of the injection screw 4.

Figure 9:
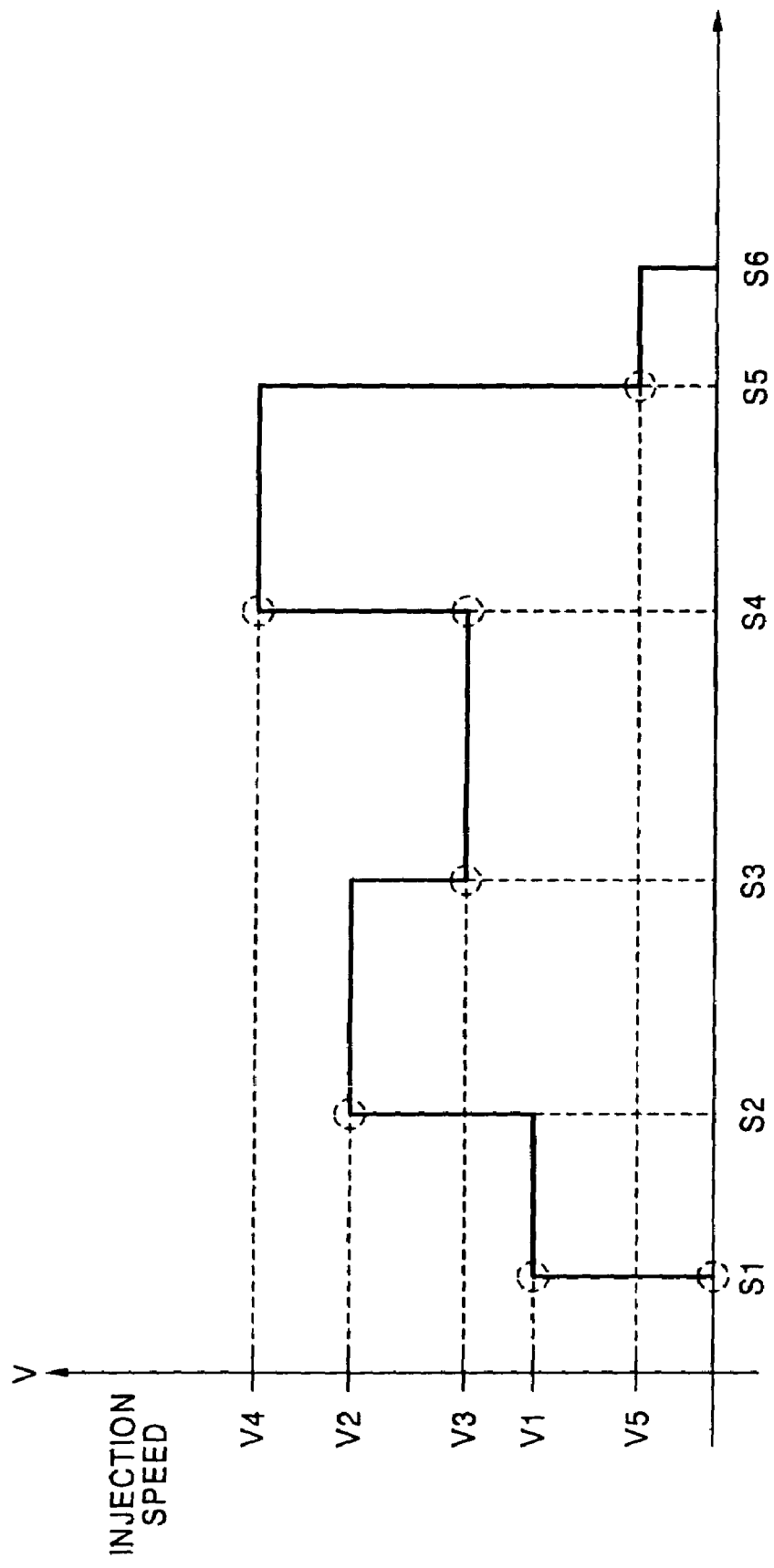
FIG. 9 is a view of an example of an injection speed pattern set in an injection speed pattern input unit.

The injection speed pattern set at the injection speed pattern input unit 32 is for example as shown in FIG. 9. It is comprised so that an operator on the user side of the injection molding machine can appropriately input this on an operation screen by an easy operation (setting 10 or more points at most).

In the injection speed pattern shown in FIG. 9, the injection speed is set at V1 to V5 between the stroke positions S1 to S6 of the injection screw 4.

As the injection speed pattern, there is an optimum pattern in accordance with various conditions such as the shape of the article to be injection molded and the type of the molding material. Usually, it is necessary to find the optimum injection speed pattern by trial and error to a certain extent. Therefore, much relies on the skill of the operator of the user side of the injection molding machine.

The injection speed pattern shown in FIG. 9 does not set the actual waveform of the injection speed. This is set by the operation of the operator. The injection speed is not finely set with respect to the stroke positions S1 to S6, so the injection speed is not finely controlled. In this way, when compared with the actual waveform of the injection speed V shown in FIG. 4, a roughly set injection speed pattern is used when given to the hydraulic injection mechanism 101. When a roughly set injection speed pattern is given to the hydraulic injection mechanism 101, the hydraulic drive system is characterized in that the injection speed fluctuates with respect to the fluctuation of the injection pressure. Therefore the actual injection speed does not correctly follow the set injection speed pattern, and the injection speed and the injection pressure will not abruptly fluctuate. For this reason, in the hydraulic control machine, it is relatively easy to obtain a molded article having a good quality by the roughly set injection speed pattern.

On the other hand, when a roughly set injection speed pattern is given to the electric injection mechanism 1, the electric injection mechanism 1 is controlled in drive so as to follow the injection speed pattern. Therefore, the injection speed does not fluctuate even if the injection pressure rises, an abrupt fluctuation of the injection speed and injection pressure occurs, and the flow of the molding material M easily changes, so a molded article having a good quality cannot always be obtained.

For this reason, in the present embodiment, as will be mentioned later, even if a roughly set injection speed pattern is given to the electric injection mechanism 1, compensation is made so that the fluctuation characteristics of the injection speed with respect to the injection pressure of the electric injection mechanism 1 approximate the fluctuation characteristics of the injection speed with respect to the injection pressure in a hydraulic injection mechanism in order to obtain a molded article having a good quality.

The injection speed reference generation unit 33 calculates the amount of movement of the injection screw 4 for every unit time, for example 1 ms, that is, the injection speed reference value from the injection speed pattern set at the injection speed pattern input unit 32. Note that, the unit time is the period for outputting the injection speed reference value.

When calculating the injection speed reference value for the injection speed pattern as shown in FIG. 9, the amount of data of the calculated injection speed reference value becomes enormous.

For this reason, in the injection speed reference generation unit 33, as shown in FIG. 10, the data is converted to data comprised by the unit time $\Delta t$, injection speed reference values $\Delta S_{12}$ to $\Delta S_{56}$ between stroke positions, and data numbers $N_{12}$ to $N_{56}$ of the injection speed reference value data between stroke positions. Note that, in FIG. 10, $\Delta S_0$ is a fraction generated when calculating the injection speed reference. This is because the stroke position of the injection screw 4 no longer correctly coincides with the target stroke position unless this fraction $\Delta S_0$ is considered.

The injection speed reference data storage unit 34 stores and keeps the injection speed reference value data as shown in FIG. 10 generated at the injection speed reference generation unit 33.

The injection pressure calculation unit 40 calculates the injection pressure P from the pressure detected by the pressure detector 21 provided in the electric injection mechanism 1 and outputs the same to the fluctuation calculation unit 39 and the deceleration calculation unit 35.

The fluctuation calculation unit 39 calculates the fluctuation $\Delta P$ per unit time of the injection pressure P input from the injection pressure calculation unit 40 one after another and outputs the same to the deceleration calculation unit 35.

The deceleration calculation unit 35 calculates the deceleration of the injection speed V estimated from the characteristic of the hydraulic drive system of the hydraulic injection mechanism 101 with respect to the detected injection pressure P and/or fluctuation $\Delta P$ per unit thereof.

More specifically, the deceleration calculation unit 35 holds the deceleration calculation equation of quantifying the deceleration of the injection speed V for every factor slowing the injection speed V with respect to the injection pressure P generated at the hydraulic injection mechanism 101 and calculates the deceleration of the injection speed V according to these deceleration calculation equations. The deceleration calculation equations are for example (1) to (6) described above.

Accordingly, in the deceleration calculation unit 35, the deceleration of the injection speed V is calculated for every factor. This deceleration is output to the reference compensation unit 36 one after another.

Note that, in the deceleration calculation unit 35, preferably deceleration calculation equations of a plurality of factors slowing the injection speed V are prepared for correctly specifying the characteristics of the hydraulic drive system, but it is also possible to select and use any equation from among prepared deceleration calculation equations.

In this case, the parameter for specifying the deceleration calculation equation to be used in the parameter storage unit 41 mentioned later may be set.

Also, in the present embodiment, the deceleration was successively calculated by using the deceleration calculation equations in the deceleration calculation unit 35, but it is also possible to hold decelerations corresponding to the injection pressure P and the fluctuation $\Delta P$ as a table in advance and select the deceleration from this table in order to reduce the amount of calculations.

The reference compensation unit 36 compensates the injection speed references $\Delta S_{12}$ to $\Delta S_{56}$ input from the injection speed reference data storage unit 34 one after another by the deceleration input from the deceleration calculation unit 35 one after another.

For example, when the injection speed reference $\Delta S$ is read from the injection speed reference data storage unit 34, and the deceleration $V_P$ of the injection speed V due to the variation of the volumetric efficiency $\eta$ of the hydraulic pump 111 and the deceleration $V_S$ of the injection speed V due to the influence of the compressibility of the working oil are input from the deceleration calculation unit 35, the reference compensation unit 36 compensates the injection speed reference $\Delta S$ as in the following equation (7). Note that, $\Delta Sm$ is the injection speed reference value after compensation.

$$\Delta Sm = \Delta S - V_S - V_P \qquad (7)$$

The reference compensation unit 36 outputs the injection speed reference value $\Delta Sm$ after compensation to the injection control unit 37.

The screw position conversion unit 43 receives as input the rotation position detected by the rotation position detector 16 provided in the injection motor 15, calculates the stroke position $S_P$ of the injection screw 4 from this rotation position information one after another, and outputs the same to the injection speed calculation unit 42.

The injection speed calculation unit 42 differentiates by time the stroke position $S_P$ of the injection screw 4 input from the screw position conversion unit 43 one after another to calculate the speed of the injection screw 4, that is, the injection speed V, and outputs the same to the injection control unit 37.

The injection control unit 37 receives as input the injection speed reference value $\Delta Sm$ after compensation and forms a speed loop and a current loop by using the injection speed V as a feedback value.

In the speed loop, a proportional operation and an integration operation are applied to the deviation for every sampling time between the injection speed reference value $\Delta Sm$ after compensation and the injection speed V to obtain a torque reference. This is output to the current loop. In the current loop, for example, a proportional operation is applied to the deviation between the output torque signal of the injection motor 15 converted from the drive current of each injection motor 15 and the torque reference to obtain a current reference. This is converted to a predetermined electric signal and output to the servo driver 38.

The servo driver 38 outputs the drive current amplified based on the current reference from the injection control unit 37 to the injection motor 15. By this, the injection motor 15 is driven in accordance with the drive current.

The parameter storage unit 41 stores and keeps the parameters required for various control of the control apparatus 31.

For example, the parameter storage unit 41 stores and keeps a parameter for defining if compensation is to be carried out in the reference compensation unit 36, parameters for the deceleration calculation equations in the deceleration calculation unit 35, a parameter for selecting the calculation equation to be used from among deceleration calculation equations of a plurality of factors, and other parameters as shown in FIG. 11.

Note that, the reference compensation unit 36 reads the parameter for defining compensation of compensation and compensates the injection speed reference only when it indicates compensation is to be performed.

The measuring control unit 44 and the servo driver 45 control the drive of the plasticizing motor 9.

Figure 8:
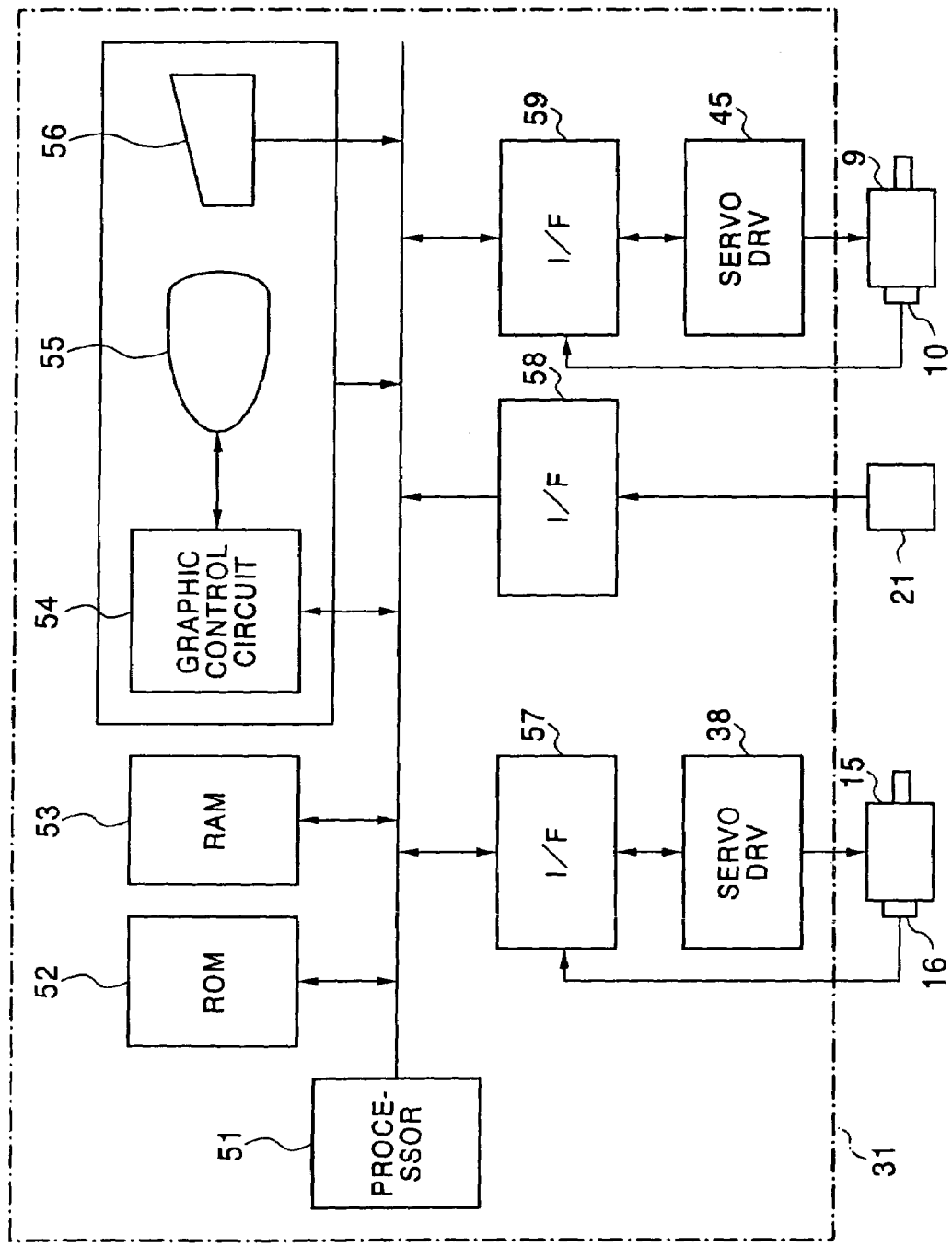
FIG. 8 is a view of an example of the hardware configuration of a control device.

FIG. 8 is a view of an example of the hardware configuration of the control apparatus 31.

The functions of the control apparatus 31 explained in FIG. 7 are realized by the hardware as shown in FIG. 8.

In FIG. 8, a microprocessor 51 is connected to a read only memory (ROM) 52, random access memory (RAM) 53, interface circuits 57, 58, and 59, a graphic control circuit 54, display 55, keyboard 56, etc. via a bus.

The microprocessor 51 controls the entire control apparatus 31 according to a system program stored in the ROM 52.

The ROM 52 stores and keeps programs for processing of the injection control unit 37, deceleration calculation unit 35, reference compensation unit 36, etc. and programs for clamping control of a not illustrated clamping apparatus and processing of various data.

The RAM 53 temporarily stores injection speed pattern data input to the injection speed pattern input unit 32, variables required for various operations (for example, injection pressure P and fluctuation ΔP), etc. The RAM 43 comprises an injection speed reference data storage unit 34, parameter storage unit 41, etc.

The interface circuit 57 converts the control references output from the microprocessor 51 to predetermined signals and outputs the same to the servo driver 38. Also, the interface circuit 57 counts the detection pulses of the rotation position detector 16 provided in the injection motor 15 one after another, converts the same to predetermined digital signals, and outputs the same to the microprocessor 51.

The interface circuit 58 converts the detection signal of the pressure detector 21 to a predetermined digital signal and outputs the same to the microprocessor 51.

The interface circuit 59 converts the control reference output from the microprocessor 51 to the predetermined signal and outputs the same to the servo driver 45. Also, the interface circuit 59 counts the detection pulses of the rotation position detector 10 provided in the metering motor 9 one after another, converts the same to predetermined digital signals, and outputs them to the microprocessor 51.

The graphic control circuit 54 converts the digital signal to a display use signal and gives the same to the display 55.

As the display 55, use is made of for example a CRT display or LCD. The display 55 displays various information for use when an operator prepares an injection speed pattern by a manual operation in a dialog format by using the keyboard 56. The operator can prepare the injection speed pattern by inputting the data according to content (dialog format data input screen) displayed on the display 55.

Figure 12A:
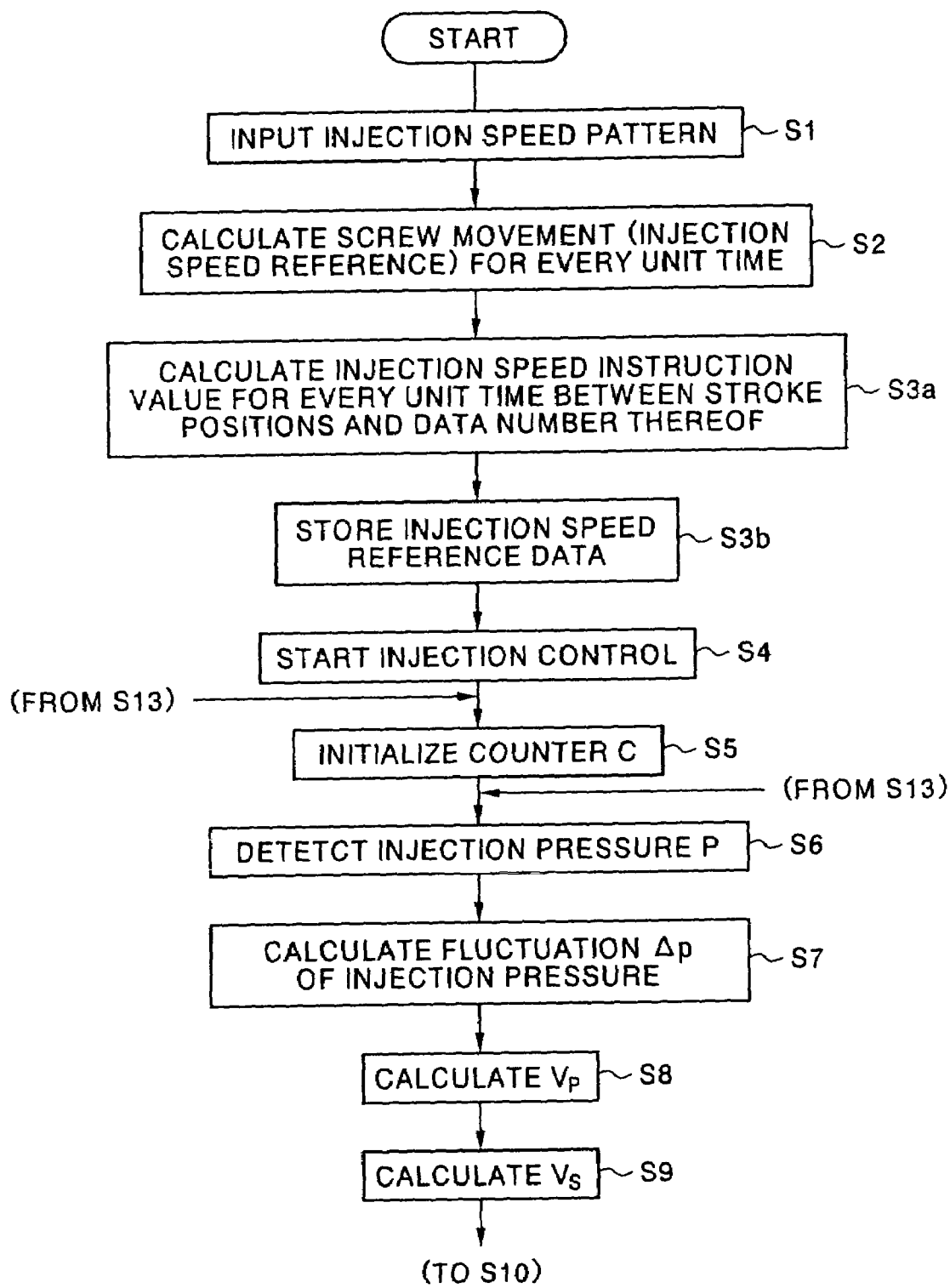
FIGS. 12A and 12B are flowcharts for explaining an injection control method of an electric injection molding machine of the present invention.
Figure 12B:
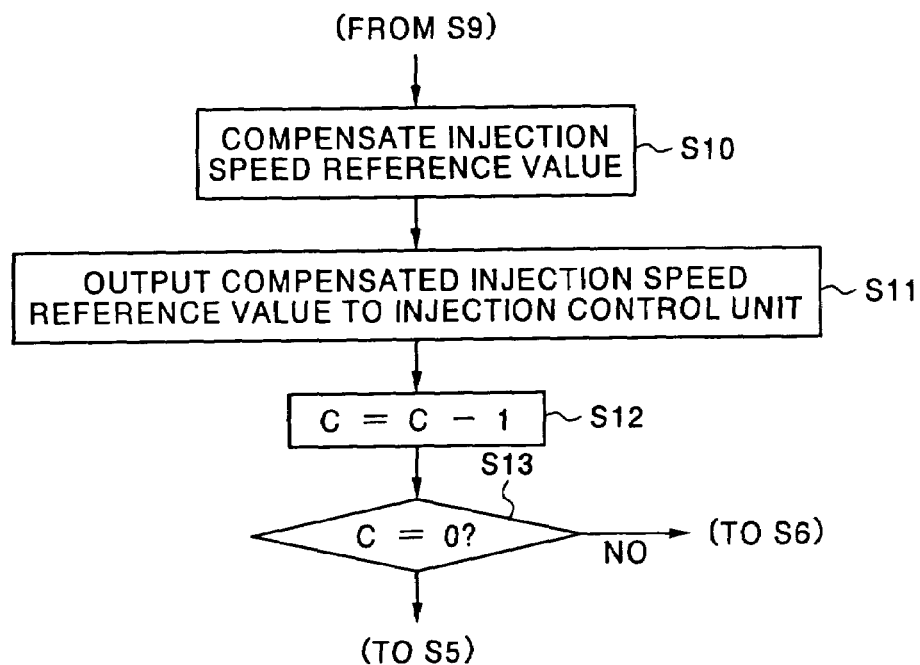

Next, an explanation will be made of the injection control method of the electric injection molding machine of the present invention by the control apparatus 31 having the above configuration by referring to the flowcharts shown in FIG. 12A and FIG. 12B. Note that, an explanation will be made of a case where the compressibility of the working oil and the hydraulic pump are considered as the factors slowing the injection speed V in the deceleration calculation unit 35.

First, the injection speed pattern as shown in FIG. 9 is input to the control apparatus 31 (step S1). As this injection speed pattern, use can be also made of one set for a hydraulic injection molding machine as it is.

Then, the injection speed reference is calculated from the input injection speed pattern at the injection speed reference generation unit 33 (step S2), and the injection speed reference data for every unit time Δt and the data number N thereof are calculated. At this time, also the fraction processing is simultaneously carried out (step S3a).

The calculated injection speed reference data is stored in the injection speed reference data storage unit 34 (step S3b).

In this state, the mold is clamped, a predetermined amount of the molding material M is fed to the injection cylinder 4, then the injection control is commenced (step S4).

When the injection control is commenced, in order to fill the molding material M in the mold by the drive of the injection screw 4, the data is read from the injection speed reference data storage unit 34, and the data number N of the injection speed reference data is set in the counter C defined in the RAM 53 of the control apparatus 31 (step S5). Note that the fraction processing by the fraction data $\Delta S_0$ stored in the injection speed reference data storage unit 34 is carried out first.

Then, the pressure from the pressure detector 21 is detected, and the injection pressure P is calculated by the injection pressure calculation unit 40 (step S6). Further, the fluctuation ΔP of the injection pressure P is calculated from the injection pressure P calculated this time and the injection pressure P calculated the previous time (step S7).

In the deceleration calculation unit 35, the deceleration $V_p$ of the injection speed V estimated by the characteristic of the hydraulic pump 111 is calculated by the above equation (6) (step S8).

Further, the deceleration $V_S$ of the injection speed V estimated from the compressibility of the working oil is calculated by the above equations (1) to (5) (step S9).

Then, in the reference compensation unit 36, by using the calculated deceleration $V_S$ and deceleration $V_P$, the injection speed reference value ΔS read from the injection speed reference data storage unit 34 is compensated by the above equation (7) (step S10) to obtain the compensated injection speed reference value ΔSm.

The compensated injection speed reference value ΔSm is output to the injection control unit 37 (step S11).

By this, the injection speed V of the injection screw 4 is controlled according to the compensated injection speed reference value ΔSm.

After the compensated injection speed reference value ΔSm is output to the injection control unit 37, the value of the counter C is decremented (step S12). The processings of steps S6 to S12 are repeatedly carried out until the value of the counter C becomes 0 (step S13).

When the value of the counter C becomes 0, that is, the injection speed reference data between first stroke positions has finished being read. The injection speed reference data between next stroke positions is then read. When all injection speed reference data are read, the molding material M has finished being filled into the mold by the injection screw 4.

Figure 13:
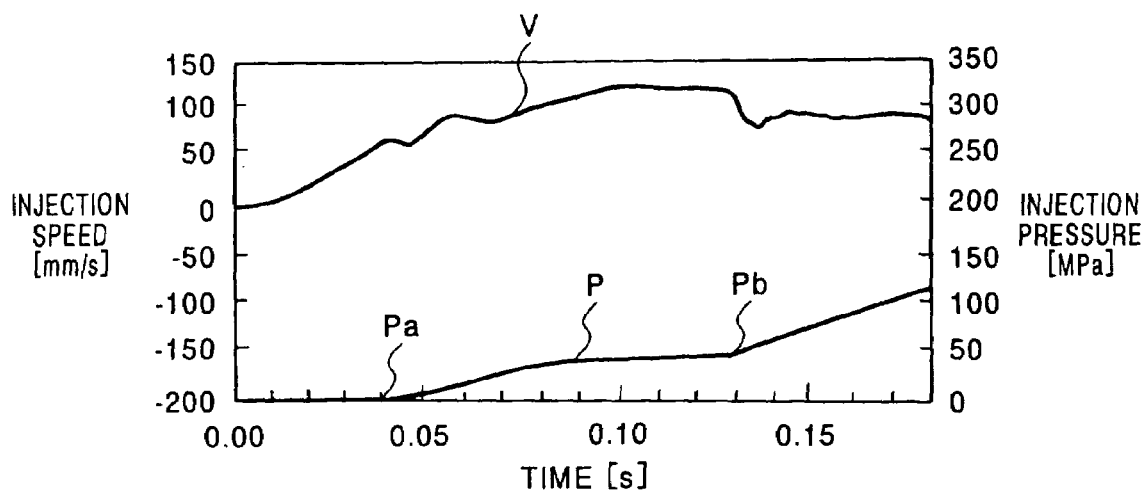
FIG. 13 is a graph of waveforms of an injection pressure and an injection speed when filling a molding material into a mold by an injection control method according to an embodiment of the present invention.

FIG. 13 is a graph of the waveform of the injection pressure P and the injection speed V when the molding material M is filled in the mold by the injection control method of the present embodiment. Note that the molding conditions of the data of FIG. 13 are molding conditions the same as the data shown in FIG. 3 and FIG. 4.

As seen from FIG. 13, the injection speed V slows near the positions Pa and Pb at which the injection pressure P rises. The fluctuation characteristics of the injection speed V with respect to the injection pressure P in this portion approximate the fluctuation characteristics of the injection speed V with respect to the injection pressure P in the hydraulic injection mechanism 101 explained in FIG. 4.

Also, in FIG. 4, the injection speed V fluctuates even at a position other than near the positions Pa and Pb at which the injection pressure P rises, but in FIG. 13, it is seen that it almost stops fluctuating at positions other than near the positions Pa and Pb at which the injection pressure P rises.

In the injection control method according to the present embodiment, not all of the characteristics of the hydraulic drive system are approximated. Only the fluctuation characteristics of the injection speed V with respect to the injection pressure P provided in the hydraulic drive system are approximated. Namely, in the injection control method according to the present embodiment, only the characteristics exerting a preferred influence upon the quality of a molded article possessed by the hydraulic drive system are extracted. These characteristics are reflected in the injection characteristics of the electric injection mechanism 1.

For this reason, according to the present embodiment, it becomes possible to impart characteristics possessed in a hydraulic drive system, such as the injection pressure P and the injection speed V not abruptly varying, to the electric injection mechanism 1 while making good use of the high response possessed in the electric injection mechanism 1.

Also, according to the present embodiment, when an injection speed pattern similar to that of a hydraulic injection molding machine is given to the electric injection mechanism 1, abrupt fluctuation of the injection pressure P and the injection speed V can be suppressed in the same way as the hydraulic injection molding machine, and it becomes possible to obtain a molded article having a similar quality to that of a hydraulic injection molding machine. Namely, this is because, in an electric injection molding machine, it is difficult to obtain a molded article having a good quality depending on the rough settings of the injection speed pattern due to its high response, but in a hydraulic injection molding machine, due to the characteristic that the injection speed slows by the rise of the injection pressure of the hydraulic drive system, it is possible to obtain a molded article having a good quality by relatively rough settings of the injection speed pattern.

According to the present embodiment, by giving a relatively rough injection speed pattern to an electric injection molding machine and compensating this based on the characteristics of a hydraulic drive system, injection control can be carried out with an injection speed pattern similar to that of a hydraulic injection molding machine. As a result, it is possible to simply and easily prepare an injection speed pattern.

Figure 14:
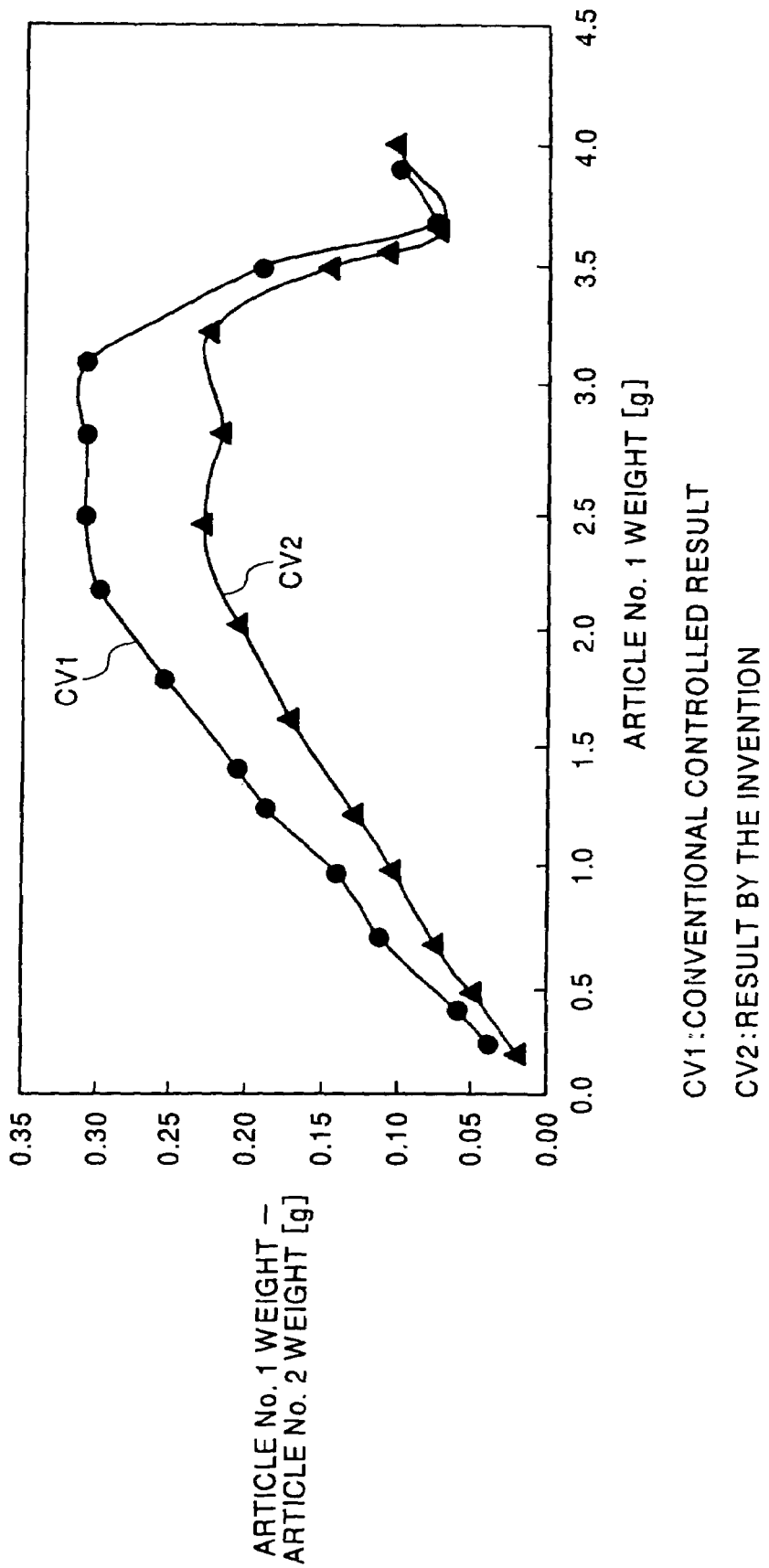
FIG. 14 is a graph of results of experiments measuring a variation of weights between two articles when injection molding using the electric injection molding machine of the present invention in a mold having two cavities.

The graph CV2 shown in FIG. 14 is a graph indicating results of experiments measuring the variation of weight between two articles when injection molding by using an electric injection molding machine according to the present embodiment for a mold having two cavities.

Note that, in FIG. 14, the graph CV1 indicates the results of conventional control not compensating the injection speed reference value at the reference compensation unit 36. This conventional control can be carried out by the control apparatus 31 by not compensating the predetermined parameters of the parameter storage unit 41. Also, in FIG. 14, the abscissa indicates the weight of one article, and an ordinate indicates a weight difference between two articles.

As seen from FIG. 14, the electric injection molding machine according to the present embodiment can reduce the variation of the weight among articles in comparison with the conventional control.

Namely, the electric injection molding machine according to the present embodiment is provided with characteristics of a hydraulic drive system of a hydraulic injection molding machine. Therefore, the injection speed slows with respect to a rise of the injection pressure when the molding material passes through the gate of the mold due to the compressibility of the working oil and the characteristics of the hydraulic equipment such as the relief valve and the hydraulic pump. For this reason, even if the injection speed and the injection pressure are not precisely controlled, the molding material relatively easily passes through a plurality of gates with a good balance, so the variation of weight among a plurality of articles can be reduced in comparison with the conventional control.

According to the present invention, even if injection molding by imparting molding conditions for a hydraulic injection molding machine to an electric injection molding machine as they are, it becomes possible to obtain molded articles having a similar quality to that by a hydraulic injection molding machine.

Also, according to the present invention, if molding conditions (injection speed pattern) similar to the molding conditions (injection speed pattern) for a hydraulic injection molding machine are set, it is possible to obtain molded articles having a similar quality to that by a hydraulic injection molding machine, so setting of the molding conditions becomes simple and easy.

Further, according to the present invention, by inputting the characteristics of the hydraulic drive system of a hydraulic injection molding machine into an electric injection molding machine, the variation of the weight among articles can be reduced when injection molding by using a mold having a plurality of cavities.

While the invention has been described with reference to specific embodiments chosen for purpose of illustration, it should be apparent that numerous modifications could be made thereto by those skilled in the art without departing from the basic concept and scope of the invention.

What is claimed is:

1. A method for controlling the injection of an electric injection molding machine comprising:
   a control step for servo control of a drive motor so that an electric injection mechanism for injecting a molding material into a mold by a drive force of an electric motor follows an injection speed reference based on predetermined molding conditions and
   a compensation step for compensating said injection speed reference based on characteristics of a hydraulic drive system so that fluctuation characteristics of the injection speed with respect to the injection pressure generated in said electric injection mechanism during servo control of the electric motor approximate the fluctuation characteristics of the injection speed with respect to the injection pressure in a hydraulic injection mechanism for injecting a molding material into a mold by the hydraulic drive system.

2. A method for controlling the injection of an electric injection molding machine as set forth in claim 1, wherein said compensation step comprises a pressure detection step for detecting an injection pressure and compensates said injection speed reference based on injection pressure detected by said detected injection pressure.

3. A method for controlling the injection of an electric injection molding machine as set forth in claim 2, wherein said compensation step further comprises a deceleration calculation step for calculating a deceleration of injection speed estimated from a detected injection pressure and/or a characteristic of said hydraulic drive system with respect to a change per unit time of the same and compensates said injection speed reference by the calculated deceleration of the injection speed.

4. A method for controlling the injection of an electric injection molding machine as set forth in claim 3, wherein said deceleration calculation step further comprises the step of calculating the deceleration of said injection speed by a deceleration calculation equation for quantizing the deceleration of the injection speed provided for each factor defining the characteristic of change of the injection speed with respect to this injection pressure of the hydraulic drive system and compensates said injection speed reference by the detected deceleration for every factor.

* * * * *